(12) United States Patent
Perkins et al.

(10) Patent No.: US 6,288,840 B1
(45) Date of Patent: Sep. 11, 2001

(54) IMBEDDED WIRE GRID POLARIZER FOR THE VISIBLE SPECTRUM

(75) Inventors: Raymond T. Perkins, Orem; Eric W. Gardner, Provo; Douglas P. Hansen, Spanish Fork, all of UT (US)

(73) Assignee: Moxtek, Orem, UT (US)

( * ) Notice: Subject to any disclaimer, the term of this patent is extended or adjusted under 35 U.S.C. 154(b) by 0 days.

(21) Appl. No.: 09/480,393

(22) Filed: Jan. 11, 2000

Related U.S. Application Data (63) Continuation-in-part of application No. 09/337,970, filed on Jun. 22, 1999, now Pat. No. 6,122,103.

(51) Int. Cl.$^7$ ................................................. G02B 5/30
(52) U.S. Cl. ............................................. 359/486; 357/485
(58) Field of Search ...................... 359/485, 486

(56) References Cited

U.S. PATENT DOCUMENTS

| | | |
|---|---|---|
| 2,224,214 | 12/1940 | Brown . |
| 2,287,598 | 6/1942 | Brown . |
| 2,748,659 | 6/1956 | Geffcken et al. . |
| 2,887,566 | 5/1959 | Marks . |
| 3,046,839 | 7/1962 | Bird et al. . |
| 3,436,143 | 4/1969 | Garrett . |
| 3,479,168 | 11/1969 | Bird et al. . |
| 3,536,373 | 10/1970 | Bird et al. . |
| 3,566,099 | 2/1971 | Makas . |
| 3,631,288 | 12/1971 | Rogers . |

(List continued on next page.)

FOREIGN PATENT DOCUMENTS

| | | |
|---|---|---|
| 416157 | 7/1925 | (DE) . |
| 296391 | 2/1950 | (DE) . |
| 3707984A1 | 3/1987 | (DE) . |
| 0317910A1 | 11/1987 | (EP) . |
| 0349144B1 | 6/1988 | (EP) . |
| 0349309B1 | 6/1988 | (EP) . |
| 0336334B1 | 8/1988 | (EP) . |
| 0357946B1 | 8/1988 | (EP) . |
| 0407830A2 | 7/1989 | (EP) . |
| 0407830B1 | 7/1989 | (EP) . |

(List continued on next page.)

OTHER PUBLICATIONS

Flanders, "Submicron periodicity gratins as artificial anisotropic dielectrics," Appl. Phys. Lett. 42 (6), Mar. 15, 1983, pp. 492–494.

Li Li and J.A. Dobrowski, "Visible broadband, wide–angle, thin–film multilayer polarizing beam splitter," Applied Optics May 1, 1996, vol. 35, No. 13, pp. 2221–2224.

Sonek et al., "Ultraviolet grating polarizers," J. Vac. Sci. Technol., 19(4), Nov./Dec. 1981, pp. 921–923.

Enger and Case, "Optical elements with ultrahigh spatial–frequency surface corrugations," Applied Optics Oct. 15, 1983, vol. 22, No. 20 pp. 3220–3228.

Knop, "Reflection Grating Polarizer for the Infrared," Optics Communications vol. 26, No. 3, Sep. 1978.

(List continued on next page.)

Primary Examiner—Darren Schuberg
(74) Attorney, Agent, or Firm—Thorpe North & Western (57) ABSTRACT

An embedded wire grid polarizer for the visible spectrum includes an array of parallel, elongated, spaced-apart elements sandwiched between first and second layers. The elements form a plurality of gaps between the elements which provide a refractive index less than the refractive index of the first layer. Regions may be formed between the elements and the first and/or second layers which also provide a refractive index which is less than the refractive index of the layers. The regions may be formed by film layers or ribs/grooves formed in the layers.

69 Claims, 5 Drawing Sheets

U.S. PATENT DOCUMENTS

| | | |
|---|---|---|
| 3,857,627 | 12/1974 | Harsch . |
| 3,876,285 | 4/1975 | Schwarzmüller . |
| 3,912,369 | 10/1975 | Kashnow . |
| 3,969,545 | 7/1976 | Slocum . |
| 4,009,933 | 3/1977 | Firester . |
| 4,025,164 | 5/1977 | Doriguzzi et al. . |
| 4,025,688 | 5/1977 | Nagy et al. . |
| 4,049,944 | 9/1977 | Garvin et al. . |
| 4,073,571 | 2/1978 | Grinberg et al. . |
| 4,181,756 | 1/1980 | Fergason . |
| 4,220,705 | 9/1980 | Sugibuchi et al. . |
| 4,221,464 | 9/1980 | Pedinoff et al. . |
| 4,268,127 | 5/1981 | Oshima et al. . |
| 4,289,381 | 9/1981 | Garvin et al. . |
| 4,456,515 | 6/1984 | Krueger et al. . |
| 4,466,704 | 8/1984 | Schuler et al. . |
| 4,512,638 | 4/1985 | Sriram et al. . |
| 4,514,479 | 4/1985 | Ferrante . |
| 4,515,441 | 5/1985 | Wentz . |
| 4,688,897 | 8/1987 | Grinberg et al. . |
| 4,711,530 | 12/1987 | Nakanowatari et al. . |
| 4,743,092 | 5/1988 | Pistor . |
| 4,759,611 | 7/1988 | Downey, Jr. . |
| 4,759,612 | 7/1988 | Nakatsuka et al. . |
| 4,799,776 | 1/1989 | Yamazaki et al. . |
| 4,818,076 | 4/1989 | Heppke et al. . |
| 4,865,670 | 9/1989 | Marks . |
| 4,895,769 | 1/1990 | Land et al. . |
| 4,913,529 | 4/1990 | Goldenberg et al. . |
| 4,946,231 | 8/1990 | Pistor . |
| 4,966,438 | 10/1990 | Mouchart et al. . |
| 4,991,937 | 2/1991 | Urino . |
| 5,029,988 | 7/1991 | Urino . |
| 5,061,050 | 10/1991 | Ogura . |
| 5,087,985 | 2/1992 | Kitaura et al. . |
| 5,113,285 | 5/1992 | Franklin et al. . |
| 5,122,887 | 6/1992 | Mathewson . |
| 5,122,907 | 6/1992 | Slocum . |
| 5,139,340 | 8/1992 | Okumura . |
| 5,157,526 | 10/1992 | Kondo et al. . |
| 5,177,635 | 1/1993 | Keilmann . |
| 5,225,920 | 7/1993 | Kasazumi et al. . |
| 5,235,443 | 8/1993 | Barnik et al. . |
| 5,235,449 | 8/1993 | Imazeki et al. . |
| 5,239,322 | 8/1993 | Takanashi et al. . |
| 5,245,471 | 9/1993 | Iwatsuka et al. . |
| 5,295,009 | 3/1994 | Barnik et al. . |
| 5,305,143 | 4/1994 | Taga et al. . |
| 5,325,218 | 6/1994 | Willett et al. . |
| 5,333,072 | 7/1994 | Willett . |
| 5,357,370 | 10/1994 | Miyatake et al. . |
| 5,383,053 | 1/1995 | Hegg et al. . |
| 5,422,756 | 6/1995 | Weber . |
| 5,436,761 | 7/1995 | Kamon . |
| 5,486,935 | 1/1996 | Kalmanash . |
| 5,486,949 | 1/1996 | Schrenk et al. . |
| 5,490,003 | 2/1996 | Van Sprang . |
| 5,506,704 | 4/1996 | Broer et al. . |
| 5,508,830 | 4/1996 | Imoto et al. . |
| 5,513,023 | 4/1996 | Fritz et al. . |
| 5,513,035 | 4/1996 | Miyatake et al. . |
| 5,517,356 | 5/1996 | Arujo et al. . |
| 5,557,343 | 9/1996 | Yamagishi . |
| 5,559,634 | 9/1996 | Weber . |
| 5,570,215 | 10/1996 | Omae et al. . |
| 5,574,580 | 11/1996 | Ansley . |
| 5,579,138 | 11/1996 | Sannohe et al. . |
| 5,594,561 | 1/1997 | Blanchard . |
| 5,612,820 | 3/1997 | Schrenk et al. . |
| 5,619,356 | 4/1997 | Kozo et al. . |
| 5,626,408 | 5/1997 | Heynderickx et al. . |
| 5,748,368 | 5/1998 | Tamada et al. . |
| 5,748,369 | 5/1998 | Yokota . |
| 5,833,360 | 11/1998 | Knox et al. . |

FOREIGN PATENT DOCUMENTS

| | | |
|---|---|---|
| 0416157A1 | 9/1989 | (EP) . |
| 0488544A1 | 11/1990 | (EP) . |
| 0507445A2 | 5/1991 | (EP) . |
| 0518111A1 | 5/1991 | (EP) . |
| 0588937B1 | 6/1991 | (EP) . |
| 0521591B1 | 7/1991 | (EP) . |
| 0543061A1 | 11/1991 | (EP) . |
| 0606940A2 | 1/1993 | (EP) . |
| 0634674A2 | 6/1993 | (EP) . |
| 0670506A1 | 9/1993 | (EP) . |
| 0744634A2 | 5/1995 | (EP) . |
| 0084502 | 8/1989 | (JP) . |
| 1781659A1 | 10/1990 | (SU) . |

OTHER PUBLICATIONS

Hass and O'Hara, "Sheet Infrared Transmission Polarizers," Applied Optics Aug. 1965, vol. 4, No. 8 pp. 1027–1031.

Bird and Parrish, Jr., "The Wire Grid as a Near–Infrared Polarizer," Lasers in Industry, pp. 886–891 (1972).

Optics $9^{th}$ Edition, pp. 338–339 (1980).

Whitbourn and Douglas, "Phase shifts in transmission line models of thin periodic metal grids," Applied Optics Aug. 15, 1989 vol. 28, No. 15, pp. 3511–3515

Glytsis and Gaylord, "High–spatial–frequency binary and multilevel stairstep gratings: polarization–selective mirros and broadband antireflection surfaces," Applied Optics Aug. 1, 1992, vol. 31, No. 22, pp. 4459–4470.

Auton, "Infrared Transmission Polarizers by Photolithography," Applied Optics Jun. 1967, vol. 6, No. 6, pp. 1023–1027.

Haggans et al., "Lamellar gratings as polarizations components for specularly reflected beams," Journal of Modern Optics, 1993, vol. 40, No. 4, pp. 675–686.

Stenkamp et al, "Grid polarizer for the visible spectral region," SPIE vol. 2213 pp. 288–296.

Handbook of Optics, 1978, pp. 10–68—10–77.

Handbook of Optics vol. II, $2^{nd}$ Edition, pp. 3.32–3.35.

Lockbihler and Depine, "Diffraction from highly conducting wire gratings of arbitrary cross–section," Jornal of Modern Optics, 1993, vol. 40, No. 7, pp. 1273–1298.

Novak et al., "Far infrared polarizing grides for use at cryogenic temperatures," Applied Optics, Aug. 15, 1989/vol. 28, No. 15, pp. 3425–3427.

Auton and Hutley, "Grid Polarizers for Use in the Near Infrared," Infrared Physics, 1972, vol. 12, pp. 95–100.

Lloyd William Taylor Manual of Advanced Undergraduate Experiments in Physics, p. 302 (1959).

Flanders, Application of ≈100 Å linewidth structures fabricated by shadowing techniques[a], J. Vac. Sci. Technol., 19(4), Nov./Dec. 1981.

Kuta and van Driel, "Coupled–wave analysis of lamellar metal transmission gratings for the visible and the infrared," J. Opt. Soc. Am. A/vol. 12, No. 5/May 1995.

IMBEDDED WIRE GRID POLARIZER FOR THE VISIBLE SPECTRUM

This application is a continuation-in-part of U.S. patent application Ser. No. 09/337,970, filed Jun. 22, 1999 now U.S. Pat. No. 6,122,103.

BACKGROUND OF THE INVENTION

1. Field of the Invention

The present invention relates to polarizing optical elements for use in the visible portion of the electromagnetic spectrum. More particularly, the present invention relates to imbedded or immersed wire grid polarizers that efficiently transmit light of a specific polarization while efficiently reflecting light of the orthogonal polarization.

2. Prior Art

Because wire grid polarizers are wavelength sensitive optical devices, imbedding the polarizer in a material or medium with an index of refraction greater than one will always change the performance of the polarizer over that available in air for the same structure. Typically, this change renders the polarizer unsuitable for the intended application. Imbedding the polarizer, however, provides other optical advantages. For example, imbedding the polarizer may provide other beneficial optical properties, and may protect the polarizer, although the performance of the polarizer itself, or polarization, may be detrimentally effected. Therefore, it is desirable to obtain the optimum performance of such an imbedded wire-grid polarizer.

Wire grids are typically disposed on an outer surface of a substrate, such as glass. Some wire grids have been totally encased in the substrate material, or glass. For example, U.S. Pat. No. 2,224,214, issued Dec. 10, 1940, to Brown, discloses forming a polarizer by melting a powdered glass packed around wires, and then stretching the glass and wires. Similarly, U.S. Pat. No. 4,289,381, issued Sep. 15, 1981, to Garvin et al., discloses forming a polarizer by depositing a layer of metallization on a substrate to form the grid, and then depositing substrate material over the grid. In either case, the wires or grid are surrounded by the same material as the substrate. As stated above, such encasement of the wires or grids detrimentally effects the optical performance of the grid.

U.S. Pat. No. 5,748,368, issued May 5, 1998, to Tamada et al., discloses a narrow bandwidth polarizer with a grid disposed on a substrate, and a wedge glass plate disposed over the grid. A matching oil is also applied over the elements which is matched to have the same refractive index as the substrate. Thus, the grid is essentially encased in the substrate or glass because the matching oil has the same refractive index. Again, such encasement of the grid detrimentally effects the optical performance of the gird.

The use of an array of parallel conducting wires to polarize radio waves dates back more than 110 years. Wire grids, generally in the form of an array of thin parallel conductors supported by a transparent substrate, have also been used as polarizers for the infrared portion of the electromagnetic spectrum.

As described in Applicants' prior application, the key factor that determines the performance of a wire grid polarizer is the relationship between the center-to-center spacing, or period, of the parallel grid elements and the wavelength of the incident radiation. If the grid spacing or period is long compared to the wavelength, the grid functions as a diffraction grating, rather than as a polarizer, and diffracts both polarizations (not necessarily with equal efficiency) according to well-known principles. When the grid spacing or period is much shorter than the wavelength, the grid functions as a polarizer that reflects electromagnetic radiation polarized parallel to the grid elements, and transmits radiation of the orthogonal polarization.

The transition region, where the grid period is in the range of roughly one-half of the wavelength to twice the wavelength, is characterized by abrupt changes in the transmission and reflection characteristics of the grid. In particular, an abrupt increase in reflectivity, and corresponding decrease in transmission, for light polarized orthogonal to the grid elements will occur at one or more specific wavelengths at any given angle of incidence. These effects were first reported by Wood in 1902 (Philosophical Magazine, September 1902), and are often referred to as "Wood's Anomalies". Subsequently, Rayleigh analyzed Wood's data and had the insight that the anomalies occur at combinations of wavelength and angle where a higher diffraction order emerges (Philosophical Magazine, vol. 14(79), pp. 60–65, July 1907). Rayleigh developed an equation to predict the location of the anomalies (which are also commonly referred to in the literature as "Rayleigh Resonances").

The effect of the angular dependence is to shift the transmission region to larger wavelengths as the angle increases. This is important when the polarizer is intended for use as a polarizing beam splitter or polarizing turning mirror.

A wire grid polarizer is comprised of a multiplicity of parallel conductive electrodes supported by a substrate. Such a device is characterized by the pitch or period of the conductors; the width of the individual conductors; and the thickness of the conductors. A beam of light produced by a light source is incident on the polarizer at an angle $\Theta$ from normal, with the plane of incidence orthogonal to the conductive elements. The wire grid polarizer divides this beam into a specularly reflected component, and a non-diffracted, transmitted component. For wavelengths shorter than the longest resonance wavelength, there will also be at least one higher-order diffracted component. Using the normal definitions for S and P polarization, the light with S polarization has the polarization vector orthogonal to the plane of incidence, and thus parallel to the conductive elements. Conversely, light with P polarization has the polarization vector parallel to the plane of incidence and thus orthogonal to the conductive elements.

In general, a wire grid polarizer will reflect light with its electric field vector parallel to the wires of the grid, and transmit light with its electric field vector perpendicular to the wires of the grid, but the plane of incidence may or may not be perpendicular to the wires of the grid as discussed here.

Ideally, the wire grid polarizer will function as a perfect mirror for one polarization of light, such as the S polarized light, and will be perfectly transparent for the other polarization, such as the P polarized light. In practice, however, even the most reflective metals used as mirrors absorb some fraction of the incident light and reflect only 90% to 95%, and plain glass does not transmit 100% of the incident light due to surface reflections.

Applicants' prior application shows transmission and reflection of a wire grid polarizer with two resonances which only affect significantly the polarizer characteristics for P polarization. For incident light polarized in the S direction, the performance of the polarizer approaches the ideal. The reflection efficiency for S polarization is greater than 90% over the visible spectrum from 0.4 μm to 0.7 μm. Over this wavelength band, less than 2.5% of the S polarized light is transmitted, with the balance being absorbed. Except for the small transmitted component, the characteristics of the wire grid polarizer for S polarization are very similar to those of a continuous aluminum mirror.

For P polarization, the transmission and reflection efficiencies of the wire grid are dominated by the resonance effect at wavelengths below about 0.5 μm. At wavelengths longer than 0.5 μm, the wire grid structure acts as a lossy dielectric layer for P polarized light. The losses in this layer and the reflections from the surfaces combine to limit the transmission for P polarized light.

Applicants' prior application also shows the calculated performance of a different type of prior-art wire gird polarizer, as described by Tamada in U.S Pat. No. 5,748,368. As stated above, an index matching fluid has been used between two substrates such that the grid is surrounded by a medium of constant refractive index. This wire grid structure exhibits a single resonance at a wavelength about 0.52 μm. There is a narrow wavelength region, from about 0.58 to 0.62 μm, where the reflectivity for P polarization is very nearly zero. U.S Pat. No. 5,748,368 describes a wire grid polarizer that takes advantage of this effect to implement a narrow bandwidth wire gird polarizer with high extinction ratio. The examples given in the Tamada patent specification used a grid period of 550 nm, and produced a resonance wavelength from 800 to 950 nm depending on the grid thickness, conductor width and shape, and the angle of incidence. The resonance effect that Tamada exploits is different from the resonance whose position is described above. While the two resonances may be coincident, they do not have to be. Tamada exploits this second resonance. Furthermore, there are thin film interference effects which may come into play. The bandwidth of the polarizer, where the reflectivity for the orthogonal-polarized light is less than a few percent, is typically 5% of the center wavelength. While this type of narrow band polarizer may have some applications, many visible-light systems, such as liquid crystal displays, require polarizing optical elements with uniform characteristics over the visible-spectrum wavelengths from 400 nm to 700 nm.

As described in Applicants' prior application, a necessary requirement for a wide band polarizer is that the longest wavelength resonance point must either be suppressed or shifted to a wavelength shorter than the intended spectrum of use. The wavelength of the longest-wavelength resonance point can be reduced in three ways. First, the grid period can be reduced. However, reducing the grid period increases the difficulty of fabricating the grid structure, particularly since the thickness of the grid elements must be maintained to ensure adequate reflectivity of the reflected polarization. Second, the incidence angle can be constrained to near-normal incidence. However, constraining the incidence angle would greatly reduce the utility of the polarizer device, and preclude its use in applications such as projection liquid crystal displays where a wide angular bandwidth centered on 45 degrees is desired. Third, the refractive index of the substrate could be lowered. However, the only cost-effective substrates available for volume manufacture of a polarizer device are several varieties of thin sheet glass, such as Corning type 1737F or Schott type AF45, all of which have a refractive index which varies between 1.5 and 1.53 over the visible spectrum.

Thus, there exists a need for a wire grid polarizer which performs optimally when imbedded or encased. In addition, there exists a need for such a wire grid polarizer, particularly for use in visible light systems requiring broad wavelength bandwidth. In addition, there is a need for such a polarizer structure in which the longest-wavelength resonance point can be eliminated or shifted to a shorter wavelength.

OBJECTS AND SUMMARY OF THE INVENTION

It is an object of the present invention to provide an embedded wire grid polarizer which can provide high transmission and reflection efficiency over the entire visible spectrum.

It is another object of the present invention to provide such an embedded wire grid polarizer which can provide such high efficiency when used over a wide range of incidence angles.

These and other objects and advantages of the present invention are realized in an embedded wire grid polarizer comprising an array of parallel, elongated, spaced-apart elements sandwiched between first and second layers. The elements form a plurality of gaps between the elements, and the gaps provide a refractive index less than the refractive index of the first or second layer. Preferably, the gaps include air or have a vacuum.

The array of elements is configured to interact with electromagnetic waves of light in the visible spectrum to generally reflect most the light of a first polarization, and transmit most the light of a second polarization. The elements preferably have a period less than 0.3 microns, and widths less than 0.15 microns.

In accordance with one aspect of the present invention, the polarizer advantageously has regions between the elements and the first and/or second layer which provide refractive indices which are less than the refractive index of the layers. A plurality of grooves may be formed in the first and/or second layers between the elements which provide the lower refractive indices. Films may be disposed between the first and/or second layer and the elements, which have refractive indices less than the refractive index of the layers.

In accordance with another aspect of the present invention, the films or grooves which may be disposed between the elements and the first and/or second layers provide optical thin film effects which can be used to still further enhance the performance of the polarizer. This enhancement can be obtained by properly adjusting the thickness and/or the number and/or the optical properties of these films or grooves to arrive at the desired over-all performance of the polarizer.

In accordance with another aspect of the present invention, the elements may be disposed in a cube, and oriented diagonally to at least one of the cube surfaces. Alternatively, the elements may be disposed between, and oriented parallel with respect to, a pair of transparent plates.

In accordance with another aspect of the present invention, the array may have a configuration, and the elements may have a size, which would normally create a resonance effect in combination with one or both of the layers within the visible spectrum. The gaps, and/or films and/or grooves, with a lower refractive index than the refractive index of one or both of the layers advantageously causes a shift of the normally occurring resonance effect to a lower wavelength. Thus, a band of visible wavelengths in which no resonance effect occurs is broadened.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
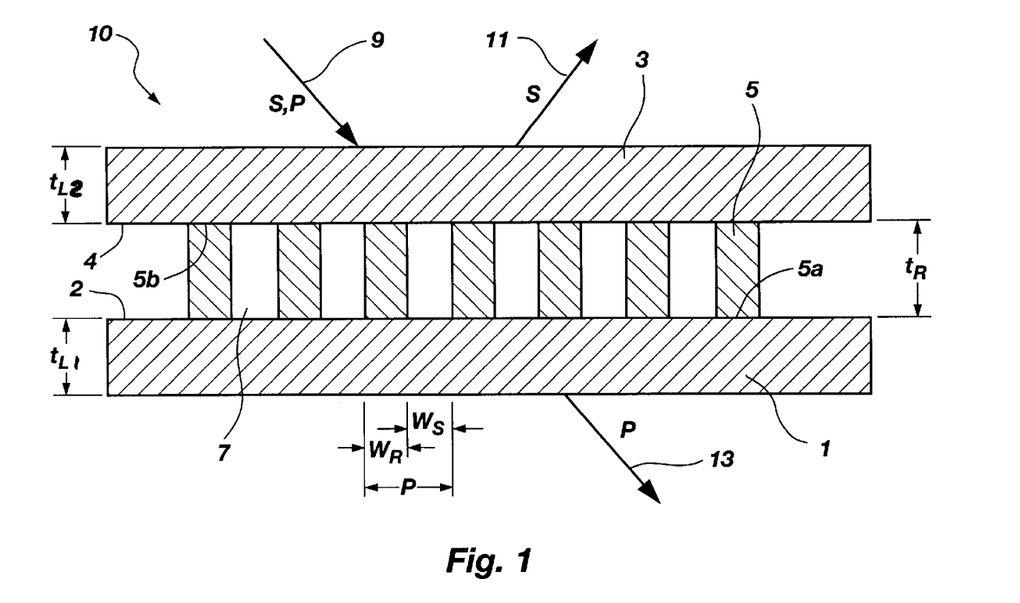
FIG. 1 is a cross-sectional view of a preferred embodiment of an embedded wire grid polarizer of the present invention.

As illustrated in FIG. 1, a preferred embodiment of an embedded wire grid polarizer of the present invention is shown, indicated generally at 10. The polarizer 10 includes a first optical medium, material, layer or substrate 1; a second optical medium, material or layer 3; and a plurality of intervening elongated elements 5 sandwiched between the first and second layers 1 and 3. As indicated above, although certain advantages are obtained by encasing or imbedding the elements, the polarization or performance of the elements is detrimentally effected. Thus, the polarizer 10 of the present invention is designed to optimize the performance when imbedded, as discussed below.

The first and second layers 1 and 3 have respective first and second surfaces 2 and 4 which face one another and the elements 5. The layers 1 and 3, or material of the layers, also have respective first and second refractive indices. The first and second optical mediums 1 and 3 each have a thickness $t_{L1}$ and $t_{L2}$, and are considered to be thick in an optical sense. They may be, for example, sheets of glass or polymer, an optical quality oil or other fluid, or other similar optical materials. The thickness $t_{L1}$ or $t_{L2}$ may be anywhere from a few microns to essentially infinite in extent. Preferably, the thickness $t_{L1}$ and $t_{L2}$ of the layers 1 and 3 is greater than 1 micron. The optical media 1 and 3 may be the same materials, such as two sheets of glass, or they may be chosen to be different materials, such as an oil for material 3 and glass for material 1. The elements 5 may be supported by the first layer or substrate 1.

The intervening array of elements 5 include a plurality of parallel, elongated, spaced-apart, conductive elements 5. The elements 5 have first arid second opposite surfaces 5a and 5b, with the first surfaces 5a facing towards the first surface 2 or first layer 1, and second surfaces 5b facing towards the second surface 4 or second layer 3. The first surfaces 5a of the elements 5 may contact and be coupled to the first surface 2 of the first layer 1, while the second surfaces 5b may contact and be coupled to the second surface 4 of the second layer 3, as shown in FIG. 1. The array of elements 5 is configured to interact with electromagnetic waves of light in the visible spectrum to generally reflect most of the light of a first polarization, and transmit most of the light of a second polarization.

The dimensions of the elements 5, and the dimensions of the arrangement of elements 5, are determined by the wavelength used, and are tailored for broad or full spectrum visible light. The elements 5 are relatively long and thin. Preferably, each element 5 has a length that is generally larger than the wavelength of visible light. Thus, the elements 5 have a length of at least approximately 0.7 μm (micrometers or microns). The typical length, however, may be much larger. In addition, the elements 5 are located in generally parallel arrangement with the spacing, pitch, or period P of the elements smaller than the wavelength of light. Thus, the pitch will be less than 0.4 μm (micrometers or microns).

The period of the elements 5, and the choices of the materials for the optical mediums 1 and 3 are all made to obtain and enhance the desired interactions with the light rays 9, 11 and 13. The ray of light 9 is typically an unpolarized beam of light containing roughly equal amounts of the two polarizations known in the field as S polarization and P polarization. However, the ray of light 9 may be altered in specific applications to be partially or mostly of either polarization as well. The period P of the elements 5 is chosen such that the wire grid will specularly reflect most of the light of the S polarized light 11, and transmit most of the P polarized light 13. The optical materials also are chosen to aid in this process. For example, it is possible to choose optical material 1 to be equally transmissive to both S and P polarizations, while choosing an optical material 3 that would absorb S polarized light or otherwise aid in the transmission of P polarized light and the reflection of S polarized light. In the preferred embodiment, the optical material composing the layers 1 and 3 is glass. Other materials are also suitable depending on the particular application.

The intervening elongated elements 5 are not very large. They will typically be arranged in a regular, ordered array having a period P on the order of 0.3 μm or less, with the width $w_R$ of the ribs 5 and the width $w_S$ of the spaces or gaps 7 separating the elements on the order of 0.15 μm or less. The width of the elements 5 and the spaces 7 can be varied to achieve desired optical performance effects, which will be further described below. The height or thickness $t_R$ of these elements 5 will typically be between that required for the elements to be optically opaque (approximately 40 nm in the case of aluminum) up to a height of perhaps 1 μm. The upper bound is fixed by considerations of manufacturing practicality as well as optical performance. In the preferred embodiment, the elements 5 are typically composed of materials such as aluminum or silver if the polarizer is to be used across the entire visible spectrum. However, if it is only required in a particular case to provide a polarizer which performs in a portion of the spectrum, such as in red light, then other materials such as copper or gold could be used.

An important factor to obtaining the optimum performance of the imbedded wire grid polarizer 10 is the material disposed within the spaces or gaps 7. The gaps 7, formed between the elements 5, advantageously provide a refractive index less than the refractive index of at least one of the layers 1 and 3, such as the first layer 1. Applicants have found that, when the gaps 7 provide a lower refractive index, the performance of the polarizer 10 is improved over wire grids totally encapsulated in a material with a constant refractive index. In the preferred embodiment, this material will be air or vacuum, but for reasons of practicality or performance in certain applications, other materials may be used. It is desirable that this material have the lowest refractive index n possible while meeting other necessary design constraints such as manufacturability. These other constraints may require that the material filling the spaces 7 between the elongated elements 5 be the same material as that composing either or both of the optical materials 1 and 3. Or, the material filling the spaces 7 between the elongated elements 5 may be chosen to be a material different from the optical materials 1 and 3. As mentioned, in the preferred embodiment, the material in the spaces 7 will be air or vacuum. Other materials which may be used include water (index 1.33), magnesium fluoride (index 1.38) or other common optical thin film materials which can be deposited using evaporation, sputtering, or various chemical vapor deposition processes, optical oils, liquid hydrocarbons such as naptha, toluene, etc. or other materials with suitably low indices.

In addition to the preferred embodiment described above, there are a number of improvements which may be implemented in particular embodiments for particular purposes. These improvements include providing a region between the elements 5 and the first and/or second layers 1 and 3 which also provides a refractive index less than the refractive index of one of the layers. Referring to FIGS. 2–9, the first surfaces 5a of the elements 5 define a first imaginary plane 16 extending across the first surfaces 5a. Similarly, the second surfaces 5b of the elements 5 define a second imaginary plane 17 extending across the second surfaces 5b. A first region 18 may be disposed between the first imaginary plane 16, which extends across the first surfaces 5a of the elements 5, and the first surface 2 of the first layer 1, which includes or provides a lower refractive index than the refractive index of the first layer 1. Similarly, a second region 19 may be disposed between the second imaginary plane 17, which extends across the second surfaces 5b of the elements 5, and the second surface 4 of the second layer 3, which includes or provides a lower refractive index than the refractive index of the second layer 3.

Figure 2:
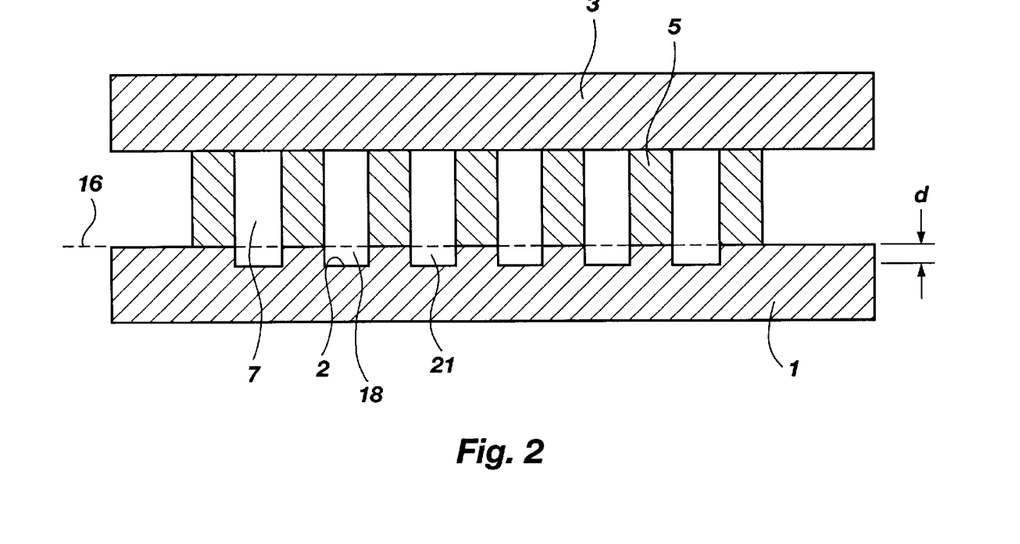
FIGS. 2–9 are cross-sectional views of alternative embodiments of an embedded wire grid polarizer of the present invention.

Turning now to FIG. 2, one such improvement is to provide grooves 21 between the elongated elements which extend into the optical media (1 and/or 3) on one side or the other. These grooves 21 can be provided during the fabrication method by processes such as reactive ion etching, etc. The depth d of the grooves 21 is critical to obtaining the proper performance. Depending on the desired optical bandwidth, transmission, extinction, and so on, the depth d of the grooves can be expected to vary from approximately 1 nm to 3000 nm.

Figure 3:
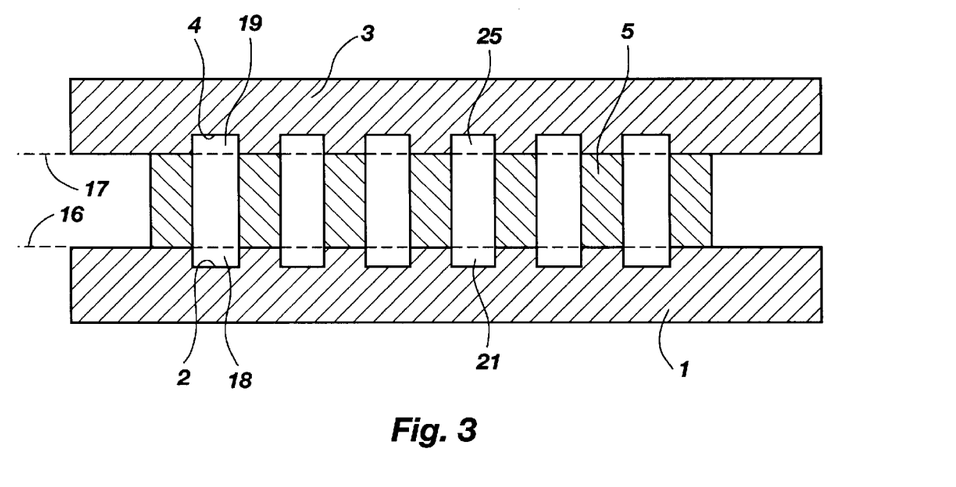
Figure 4:
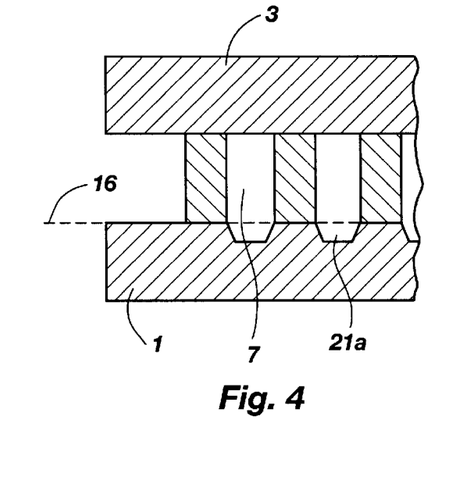
Figure 5:
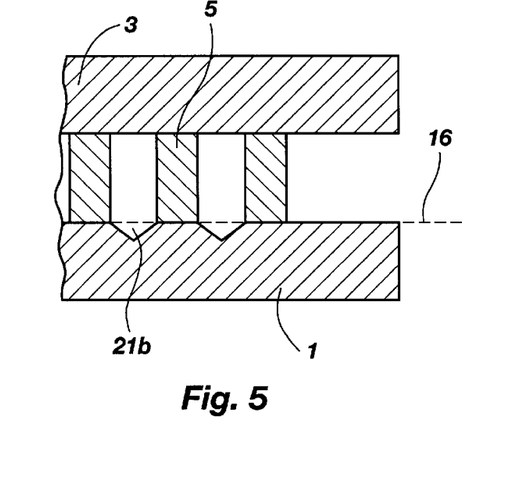

Typically, the width $w_g$ of the grooves 21 will be the same as the space between the elongated elements 5. However, practical fabrication processes and issues can be expected to reduce the width somewhat in comparison to the width $w_s$ between the elongated elements 5. The invention also includes the possibility that future advances in technology will make it practical to fabricate the grooves to a different width than the space 7 between the elongated elements 5. FIG. 3 shows an extensior of the concept by adding a top groove 25 in addition to the bottom groove 21. The purpose of the grooves is to create an effective optical index which is reduced in comparison to the optical index of the basic optical material 1 and 3. This reduced optical index in the regions 18 and 19 near the elongated elements 5 further enhances the performance of the imbedded wire grid polarizer. Even though the grooves in FIG. 2 and FIG. 3 are depicted as rectangular, it should not be inferred that this is the only useful or desirable shape. In fact, the manufacturing process is likely to create trapezoidal shapes (21a in FIG. 4) rather than perfect rectangles, and V-shaped grooves (21b in FIG. 5) may be of use as well.

Figure 6:
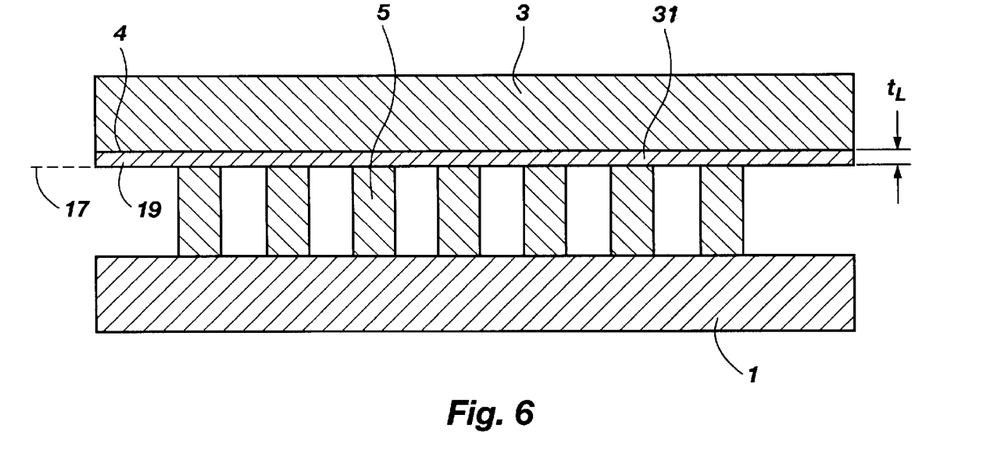
Figure 7:
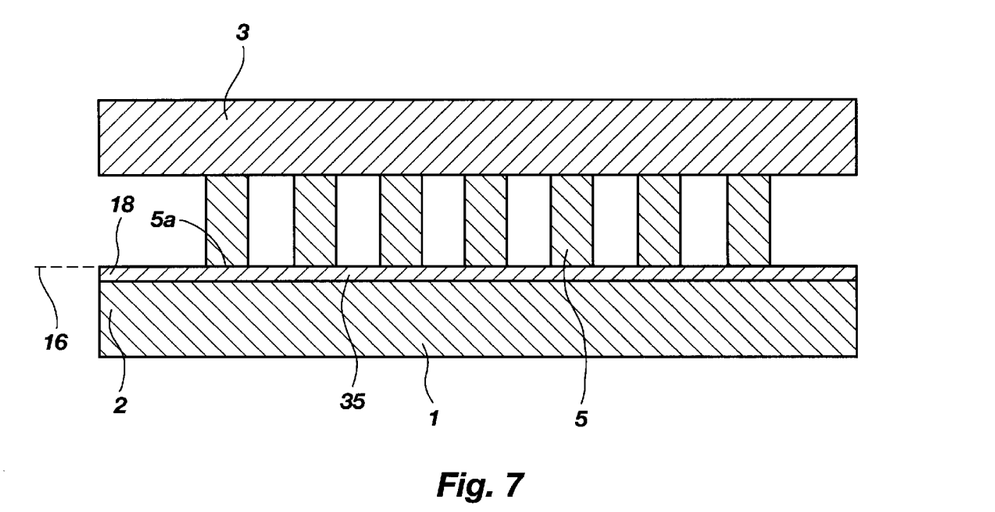

FIG. 6 shows an alternate method of obtaining the advantage of a reduced optical index in the region 19 near the elongated elements 5 by adding a thin film 31 of material with an optical index which is reduced in comparison to the optical material 3 on which it is disposed. This film will typically have an optical index n lying between 1.0 and 1.7. It will typically have a thickness $t_L$ lying between 10 nm and 5000 nm. A preferred material would be magnesium fluoride, but other common dielectric optical materials may be suitable for various applications. It should not be assumed that a single layer optical film is the only possibility because only a single layer is shown in the drawing. Depending on the application requirements, it may be advantageous to have multiple layers of thin optical films. Also, one or more low index films 35 could be introduced on the bottom as well as the top of the elongated elements 5, as shown in FIG. 7.

Figure 8:
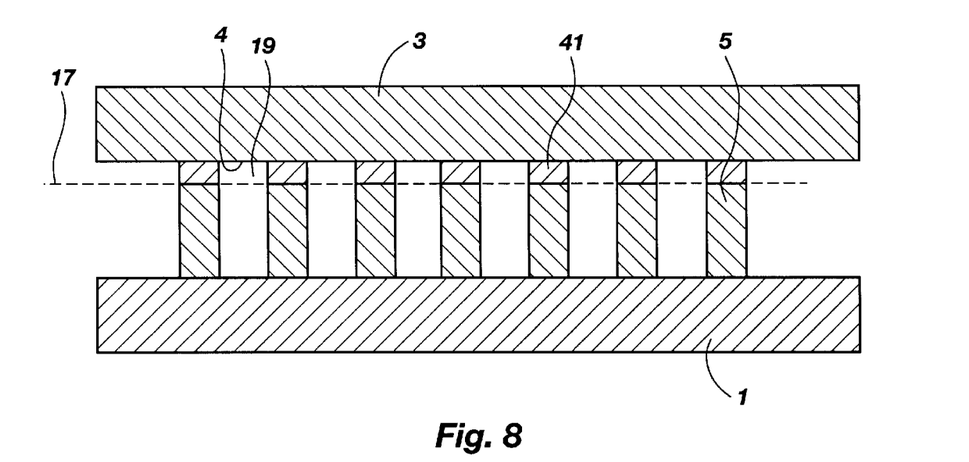

FIG. 8 shows still another improvement of the invention in which a thin film of material has been etched in a combination of the concepts shown in FIG. 2 and FIG. 6. The remaining ribs 41 of optical material are composed of a material which may have an optical index which is reduced in comparison to the optical material 3 on which it is disposed. An alternative preference may be for material which does not have an index which is significantly reduced in comparison to the supporting optical material 3, but which has other properties which aid in the manufacture, such as being easy to etch. One preferred material for the ribs 41 would be magnesium fluoride. Other preferred materials may be a polymer material, or silicon dioxide, both of which are easily etched using many techniques. Again, the ribs etched in film may be formed on either layer on either side of the elements.

Figure 9:
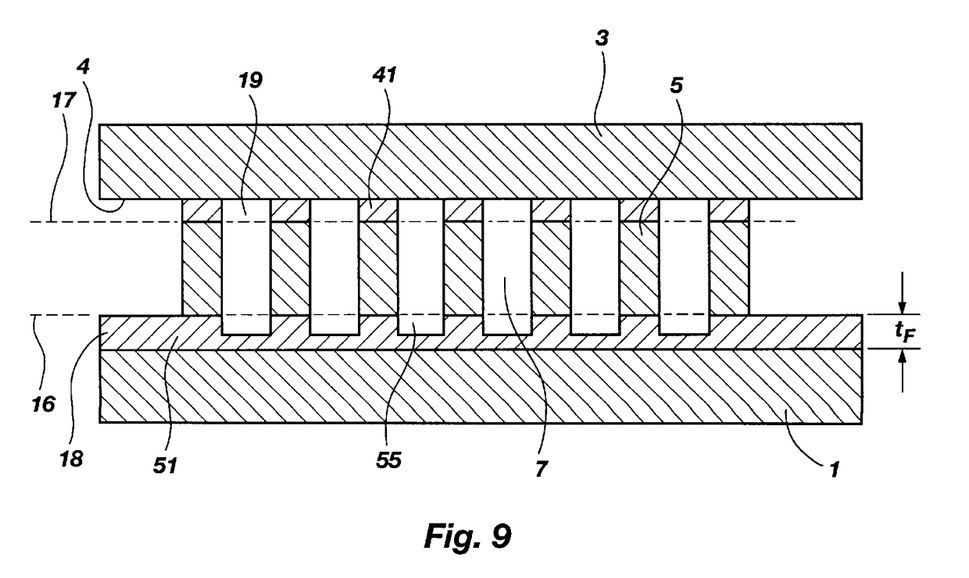

FIG. 9 shows yet another improvement of the invention in which multiple thin films are prepared and etched either completely or partially. The ribs 41 of optical material are the same as described above. The optical film 51 is selected to have one or both of the characteristics of: a lower refractive index than the optical material 1, and the ease with which it can be etched and patterned. The groove 55 etched into the optical film 51 may be etched all the way through the film, and perhaps even into the underlying optical material 1, or it may be stopped at an intermediate point, as shown. If the groove 55 is stopped as shown, this has the effect of creating a bi-layer optical thin film stack which may have advantages in tuning the performance of 10. the polarizer as a whole. The thickness $t_F$ of the optical film 51 will typically lie between approximately 10 nm and 5000 nm. The index of the optical material composing the film 51 typically will lie between 1.0 and 1.7, though still higher indices may be of value in unusual circumstances. The grooves 55 etched in the film 51 typically will have a width roughly equal to the space 7 between the elongated elements 5, though other variations in width are certainly possible and may be preferred depending on the needs of the application. Again, as mentioned earlier, the grooves 55, though depicted as rectangular, may also be trapezoidal or V-shaped and still provide significant benefit.

In addition, the films or grooves which may be disposed between the elements 5 and the first and/or second layers 1 and 3 also provide optical thin film effects which can be used to still further enhance the performance of the polarizer 10. This enhancement can be obtained by properly adjusting the thickness and/or the number and/or the optical properties of these films or grooves to arrive at the desired over-all performance of the polarizer 10.

Figure 10:
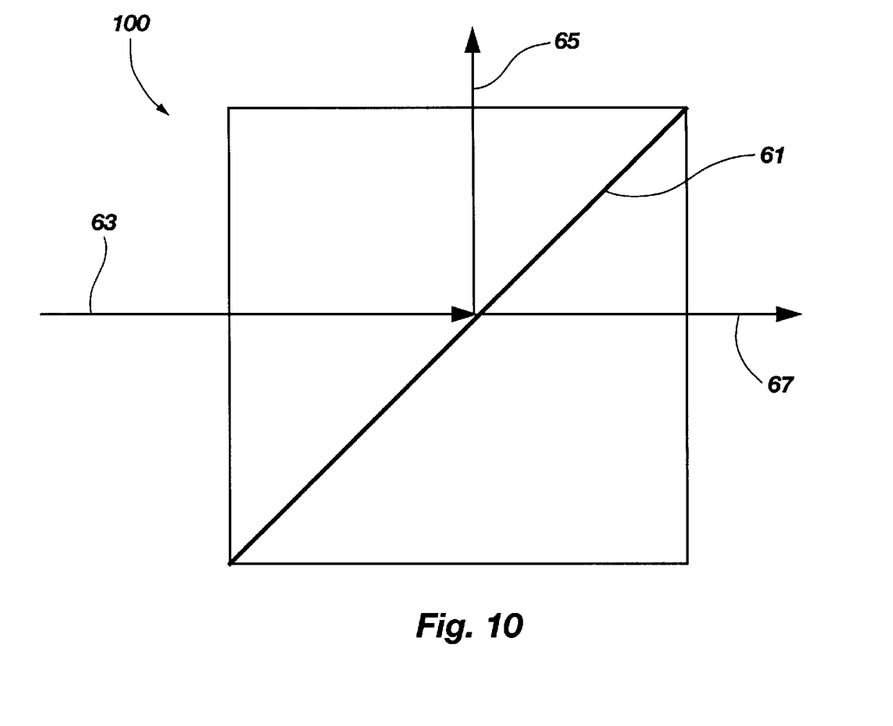
FIG. 10 is a side view of a cube incorporating an embedded wire grid polarizer of the present invention.

The above invention can be used in many optical applications. For example, as shown in FIG. 10, the imbedded wire grid polarizer can be used in a polarizing beam splitter cube 100. This cube would function in a manner similar to the common MacNeille prism, but with certain advantages. The wire grid polarizer possesses a wider angular aperture than the MacNeille prism, and also has a much improved performance in the corners of the aperture where the rays in a cone of light incident on the polarizing interface 61 in the middle of the cube are best described with compound angles. The polarizing interface 61 containing the imbedded wire grid polarizer reflects most of the S polarized light 65, while transmitting most of the P polarized light 67 from a beam of light 63. This interface 61 may contain any or all of the improvements described above. In this manner, the imbedded wire grid polarizer creates an alternate polarizing cube beam splitter with several performance advantages over the MacNeille polarizing cube beam splitter.

Figure 11:
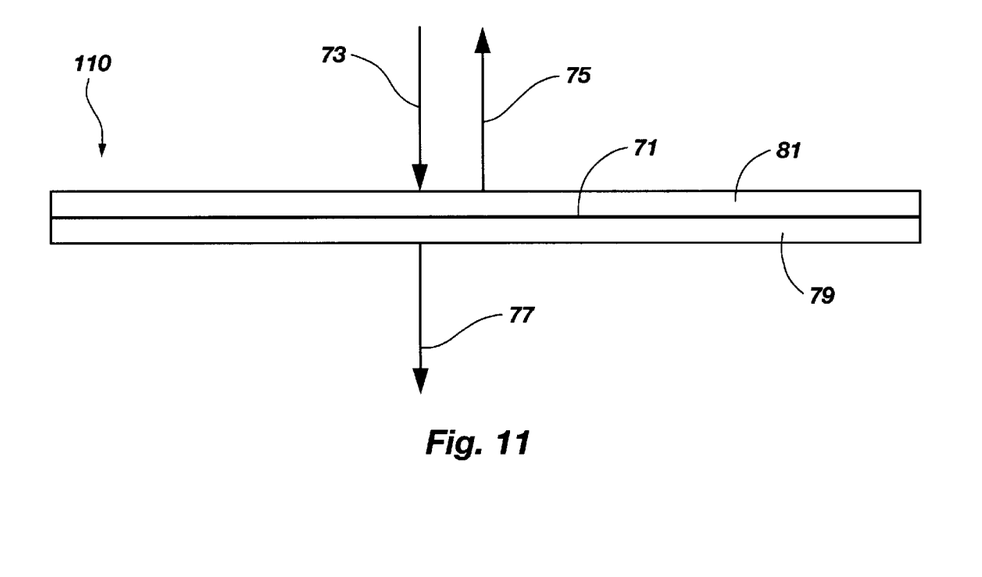
FIG. 11 is a side view of a pair of glass plates incorporating an embedded wire grid polarizer of the present invention.

The imbedded polarizer may also be used in a flat plate format 110, such as is shown in FIG. 11. This embodiment typically would consist of glass plates 79 and 81 as shown, which surround the polarizing interface 71 containing the imbedded wire grid polarizer. This interface 71 may contain any or all of the improvements described above. The polarizer serves to polarize a beam of light incident on the first plate 79 by reflecting back at the specular angle a beam of light 75 having the opposite polarization. These light beams 73, 75, and 77 are shown as being at normal incidence only for convenience. Again, the imbedded wire grid polarizer has a large angular aperture and will function with light beams coming at a variety of angles.

A wide bandwidth wire grid polarizer is described in applicants' U.S. patent application Ser. No. 09/337,970, which is herein incorporated by reference. Such a polarizer also includes an array of parallel, conductive elements separated from a supporting substrate by a region with a low refractive index and a controlled thickness. The low index region separating the wire grid from the substrate serves two purposes in the polarizer device. First, the presence of the low refractive index shifts the longest wavelength resonance point to a shorter wavelength. Second, the low index region can be implemented as one or more layers of controlled thickness designed to reduce the fraction of P polarized light that is reflected from the polarizer.

One way of reducing the longest wavelength at which resonance occurs for a given angle of incidence, is to reduce the period. But reducing the period creates manufacturing difficulties. Thus, the pitch P preferably will be approximately one-half the wavelength of light, or approximately 0.2 $\mu$m. Again, it will be noted that grids with longer periods (greater than approximately twice the wavelength of light or 1.4 $\mu$m) operate as diffraction gratings; grids with shorter periods (less than approximately half the wavelength of light or 0.2 $\mu$m) operate as a polarizer; and grids with periods in the transition region (between approximately 0.2 and 1.4 $\mu$m) also act as diffraction gratings and are characterized by abrupt changes or anomalies referred to as resonances. As indicated above, prior art devices characterized by resonances within the visible spectrum have narrow operating ranges due to the anomalies which occur at various wavelengths within the visible spectrum. This transition region is an important concept in understanding the behavior of the wire grid. Wide bandwidth polarizers must necessarily be designed to stay outside this transition region in order to obtain wide bandwidth performance over the spectrum of intended use. Therefore, the bounds of this transition region are useful in defining the upper limits on the period of the wire grid of the present invention.

The grooves, ribs, or film layers have a height or thickness and define the region disposed between the elements and the layers. The region created by the grooves, ribs or film layers advantageously have average indices of refraction which are significantly less than the index of refraction of the layers. The region has a thickness, which is defined by the height or thickness of the ribs, depth of the grooves, or thickness of the film. The height or thickness of the region may be altered to adjust the performance of the polarizer. Separating the elements from the layers, and interposing a region having a lower refractive index than that of the layers, advantageously increases the p-polarization transmission efficiency of the polarizer at shorter wavelengths, lowers the minimum wavelength at which the polarizer is useful, or shifts the highest resonance point to a shorter wavelength, as discussed more fully in applicants' prior application.

It is noted that the array of elements 5 is not drawn to scale and has been greatly exaggerated for clarity. In fact, the arrangement of elements is imperceptible to the naked eye and appears as a partially mirrored surface when observed without extreme magnification.

It is to be understood that the described embodiments of the invention are illustrative only, and that modifications thereof may occur to those skilled in the art. In addition, while a primary benefit of the invention is to improve the performance of an imbedded polarizer in the visible spectrum, the invention may also be used to improve the transmission of polarizer devices for use in other regions of the spectrum, such as the infrared. Other alterations will surely occur to those skilled in the art given the significant increase in design flexibility over the prior art that is achieved by the present invention. Accordingly, this invention is not to be regarded as limited to the embodiments disclosed, but is to be limited only as defined by the appended claims herein.

What is claimed is:

1. An embedded wire grid polarizer for the visible spectrum, the polarizer comprising:

a first layer having a refractive index;

a second layer, separate from the first layer, having a refractive index; and an array of parallel, elongated, spaced-apart elements, sandwiched between the first and second layers, and forming a plurality of gaps between the elements, the gaps providing a refractive index less than the refractive index of the first layer.

2. The polarizer of claim 1, wherein the gaps between the elements include air.

3. The polarizer of claim 1, wherein the gaps between the elements have a vacuum.

4. The polarizer of claim 1, wherein gaps between the elements include a material different from materials of the first and second layers.

5. The polarizer of claim 1, wherein the gaps between the elements includes a material the same as a material of one of the first and second layers.

6. The polarizer of claim 1, wherein the gaps between the elements include water.

7. The polarizer of claim 1, wherein the gaps between the elements include magnesium fluoride.

8. The polarizer of claim 1, wherein the gaps between the elements include oil.

9. The polarizer of claim 1, wherein the gaps between the elements include hydrocarbon.

10. The polarizer of claim 1, wherein the first and second layers each have a thickness greater than 1 micron; and wherein the elements have a thickness between 0.04 to 1 microns.

11. The polarizer of claim 1, wherein the elements have a period less than 0.3 microns; wherein the elements have widths less than 0.15 microns; and wherein the gaps have widths less than 0.15 microns.

12. The polarizer of claim 1, wherein the first layer further has a first surface facing the elements, and the elements further have first surfaces facing the first layer and defining an imaginary plane extending across the first surfaces of the elements; and further comprising:
- a region, between the imaginary plane and the first surface of the first layer, providing a refractive index which is less than the refractive index of the first layer.

13. The polarizer of claim 1, wherein the first layer has a first surface, and wherein the elements are disposed on the first surface of the first layer; and further comprising:
- a plurality of grooves formed in the first surface of the first layer between the elements.

14. The polarizer of claim 13, wherein the grooves have a depth between approximately 0.001 to 3 microns.

15. The polarizer of claim 1, wherein the first and second layers have respective first and second surfaces between which the elements are disposed; and further comprising:
- a first plurality of grooves formed in the first surface of the first layer between the elements; and
- a second plurality of grooves formed in the second surface of the second layer between the elements.

16. The polarizer of claim 1, further comprising:
- a film, disposed between the first layer and the elements, having a refractive index which is less than the refractive index of the first layer.

17. The polarizer of claim 16, wherein the refractive index of the film is between approximately 1 and 1.7.

18. The polarizer of claim 16, wherein the film has a thickness between approximately 0.01 and 5 microns.

19. The polarizer of claim 16, wherein the film includes a dielectric material.

20. The polarizer of claim 19, wherein the dielectric material of the film includes magnesium fluoride.

21. The polarizer of claim 1, further comprising:
- a first film, disposed between the first layer and the elements, having a refractive index which is less than the refractive index of the first layer; and
- a second film, disposed between the second layer and the elements, having a refractive index which is less than the refractive index of the second layer.

22. The polarizer of claim 1, further comprising:
- an array of parallel, elongated, spaced-apart ribs, extending from the first layer towards the elements and oriented parallel with the elements with one rib extending towards each element.

23. The polarizer of claim 22, wherein the array of ribs provides a refractive index less than the refractive index of the first layer.

24. The polarizer of claim 22, wherein the ribs include magnesium fluoride.

25. The polarizer of claim 22, wherein the ribs include silicon dioxide.

26. The polarizer of claim 1, further comprising:
- a film, disposed between the first layer and the elements; and
- a plurality of grooves, formed in the film between the elements.

27. The polarizer of claim 26, wherein the film has a refractive index less than the refractive index of the first layer.

28. The polarizer of claim 26, wherein the film has a refractive index between approximately 1 and 1.7.

29. The polarizer of claim 26, wherein the film has a thickness between approximately 0.01 and 5 microns.

30. The polarizer of claim 1, wherein the elements are disposed in a cube, and oriented diagonal to at least one cube surface.

31. The polarizer of claim 1, wherein the elements are disposed between and oriented parallel with respect to a pair of transparent plates.

32. The polarizer of claim 1, wherein the array has a configuration and the elements have a size which would normally create a resonance effect in combination with one of the layers within the visible spectrum; and wherein the gaps with a lower refractive index than the refractive index of one of the layers causes a shift of the normally occurring resonance effect to a lower wavelength, thereby broadening a band of visible wavelengths in which no resonance effect occurs.

33. The polarizer of claim 1, wherein the array of elements is configured to interact with electromagnetic waves of light in the visible spectrum to generally reflect most the light of a first polarization and transmit most the light of a second polarization.

34. An imbedded wire grid polarizer for the visible spectrum, the polarizer comprising:
- first and second separate layers having respective first and second surfaces facing towards one another, and respective first and second refractive indices;
- an array of parallel, elongated, spaced-apart elements, sandwiched between the first and second surfaces of the first and second layers, the elements having first surfaces facing towards the first surface of the first layer and defining an imaginary plane extending across the first surfaces of the elements; and
- a region, between the imaginary plane extending across the first surfaces of the elements and the first surface of the first layer, having a refractive index which is less than the refractive index of the first layer.

35. The polarizer of claim 34, wherein the region includes a plurality of grooves formed in the first surface of the first layer between the elements.

36. The polarizer of claim 35, wherein the grooves have a depth between approximately 0.001 to 3 microns.

37. The polarizer of claim 34, wherein the elements further have second surfaces facing the second surface of the second layer and defining a second imaginary plane extending across the second surfaces of the elements; and further comprising:
- a second region, between the second imaginary plane extending across the second surfaces of the elements and the second surface of the second layer, having a refractive index which is less than the refractive index of the second layer.

38. The polarizer of claim 37, wherein the regions include:
- a first plurality of grooves formed in the first surface of the first layer between the elements; and
- a second plurality of grooves formed in the second surface of the second layer between the elements.

39. The polarizer of claim 34, wherein the region includes:
- a film, disposed between the first layer and the elements, having a refractive index which is less than the refractive index of the first layer.

40. The polarizer of claim 39, wherein the refractive index of the film is between approximately 1 and 1.7.

41. The polarizer of claim 39, wherein the film has a thickness between approximately 0.01 and 5 microns.

42. The polarizer of claim 39, wherein the film includes a dielectric material.

43. The polarizer of claim 42, wherein the film includes magnesium fluoride.

44. The polarizer of claim 37, wherein the regions include:
- a first film, disposed between the first layer and the elements, having a refractive index which is less than the refractive index of the first layer; and
- a second film, disposed between the second layer and the elements, having a refractive index which is less than the refractive index of the second layer.

45. The polarizer of claim 34, wherein the region includes:
- an array of parallel, elongated, spaced-apart ribs, extending from the first layer towards the elements.

46. The polarizer of claim 45, wherein the ribs include magnesium fluoride.

47. The polarizer of claim 45, wherein the ribs include silicon dioxide.

48. The polarizer of claim 34, wherein the region includes:
- a film, disposed between the first layer and the elements; and
- a plurality of grooves, formed in the film between the elements.

49. The polarizer of claim 48, wherein the film has a refractive index between approximately 1 and 1.7.

50. The polarizer of claim 48, wherein the film has a thickness between approximately 0.01 and 5 microns.

51. The polarizer of claim 34, wherein the array of elements forms a plurality of gaps between the elements, the gaps providing a refractive index less than the refractive index of one of the layers.

52. The polarizer of claim 51, wherein the gaps between the elements include air.

53. The polarizer of claim 51, wherein the gaps between the elements have a vacuum.

54. The polarizer of claim 51, wherein the gaps between the elements include a material different from materials of the first and second layers.

55. The polarizer of claim 51, wherein the gaps between the elements include a material the same as a material of one of the first and second layers.

56. The polarizer of claim 51, wherein the gaps between the elements include water.

57. The polarizer of claim 51, wherein the gaps between the elements include magnesium fluoride.

58. The polarizer of claim 51, wherein the gaps between the elements include oil.

59. The polarizer of claim 51, wherein the gaps between the elements include hydrocarbon.

60. The polarizer of claim 51, wherein the array has a configuration and the elements have a size which would normally create a resonance effect in combination with one of the layers within the visible spectrum; and wherein the gaps with a lower refractive index than the refractive index of one of the layers causes a shift of the normally occurring resonance effect to a lower wavelength, thereby broadening a band of visible wavelengths in which no resonance effect occurs.

61. The polarizer of claim 34, wherein the first and second layers each have a thickness greater than 1 micron; and wherein the elements have a thickness between 0.04 to 1 microns.

62. The polarizer of claim 34, wherein the elements have a period less than 0.3 microns; wherein the elements have a width less than 0.15 microns; and wherein the elements are separated by spaces with widths less than 0.15 microns.

63. The polarizer of claim 34, wherein the elements are disposed in a cube, and oriented diagonal to at least one cube surface.

64. The polarizer of claim 34, wherein the elements are disposed between and oriented parallel with respect to a pair of transparent plates.

65. The polarizer of claim 34, wherein the array of elements is configured to interact with electromagnetic waves of light in the visible spectrum to generally reflect most the light of a first polarization and transmit most the light of a second polarization.

66. An embedded wire grid polarizer for the visible spectrum, the polarizer comprising:
- a substrate having a first surface and a first refractive index;
- an array of parallel, elongated, spaced-apart elements, coupled to and oriented parallel to the substrate, configured to interact with electromagnetic waves of light in the visible spectrum to generally reflect most the light of a first polarization and transmit most the light of a second polarization, and forming a plurality of gaps between the elements, the gaps providing a refractive index less than the first refractive index of the substrate; and
- a layer, coupled to and oriented parallel to the array of elements, having a second refractive index.

67. The device of claim 66, wherein the array has a configuration and the elements have a size which would normally create a resonance effect in combination with the substrate within the visible spectrum; and wherein the gaps with a lower refractive index than the first refractive index of the substrate causes a shift of the normally occurring resonance effect to a lower wavelength, thereby broadening a band of visible wavelengths in which no resonance effect occurs.

68. The device of claim 66, wherein the elements further have first surfaces facing the first surface of the substrate and defining an imaginary plane extending across the first surfaces of the elements; and further comprising:
- a region, between the imaginary plane extending across the first surfaces of the elements and the first surface of the substrate, the region providing a refractive index which is less than the first refractive index of the substrate.

69. The device of claim 66, wherein the elements further have second surfaces facing the second surface of the second layer and defining a second imaginary plane extending across the second surfaces of the elements; and further comprising:
- a second region, between the second imaginary plane extending across the second surfaces of the elements and the second surface of the second layer, the region providing a refractive index which is less than the refractive index of the second layer.

* * * * *